United States Patent [19]

Mitsufuji

[11] Patent Number: 4,611,710
[45] Date of Patent: Sep. 16, 1986

[54] HINGE-TYPE TABLE TOP CHAIN

[75] Inventor: Takashi Mitsufuji, Osaka, Japan

[73] Assignee: Tsubakimoto Chain Co., Osaka, Japan

[21] Appl. No.: 570,139

[22] Filed: Jan. 12, 1984

[30] Foreign Application Priority Data

Jan. 14, 1983 [JP] Japan ............................ 58-2715[U]
May 19, 1983 [JP] Japan .......................... 58-73774[U]

[51] Int. Cl.⁴ ............................................ B65G 47/84
[52] U.S. Cl. .............................. 198/803.01; 198/853
[58] Field of Search ............... 198/853, 851, 648, 850, 198/803.01; 403/393

[56] References Cited

U.S. PATENT DOCUMENTS

| | | | |
|---|---|---|---|
| 2,955,700 | 10/1960 | Badger | 198/851 |
| 3,672,488 | 6/1972 | Collins | 198/853 X |
| 3,842,968 | 10/1974 | Owens | 198/851 |
| 3,868,011 | 2/1975 | Janzen et al. | 198/853 |
| 3,881,593 | 5/1975 | Mushovic et al. | 198/853 |
| 3,910,404 | 10/1975 | Henrekson | 198/648 X |
| 3,944,059 | 3/1976 | Garvey | 198/851 X |
| 3,952,860 | 4/1976 | Specht | 198/648 X |
| 4,039,148 | 8/1977 | Tamura et al. | 198/648 X |
| 4,078,654 | 3/1978 | Sarovich | 198/850 X |

FOREIGN PATENT DOCUMENTS

| | | | |
|---|---|---|---|
| 723469 | 12/1965 | Canada | 198/851 |
| 2055731 | 3/1981 | United Kingdom | 198/851 |
| 2107020 | 4/1983 | United Kingdom | 198/853 |

Primary Examiner—Robert J. Spar
Assistant Examiner—Jonathan D. Holmes
Attorney, Agent, or Firm—Flynn, Thiel, Boutell & Tanis

[57] ABSTRACT

A hinge-type table top chain having a plurality of links which are disposed in series and hingedly connected together. Each link includes a metal link plate having wound hinge parts on opposite ends thereof, with the hinge parts of adjacent links interfitting and being joined together by hinge pins. The link plate has a central portion, preferably a substantially planar platelike portion, having engaging portions or openings associated therewith. A separate top plate of a plastics material is positioned to overlie the link plate. The top plate has projections which are integral therewith and project from the underside thereof, which projections cooperatively engage the central part of the link plate, such as by a snap-type connection, for fixedly but releasably connecting the plates together. The top plates are sized such that the edges of longitudinally adjacent top plates are positioned in opposed but closely adjacent relationship. In addition, either the link plate or the top plate may be provided with a pair of sidewardly spaced, transversely extending guide plates projecting downwardly therefrom for slidable guiding engagement with a fixed guide rail.

1 Claim, 64 Drawing Figures (PRIOR ART) (PRIOR ART)

HINGE-TYPE TABLE TOP CHAIN

FIELD OF THE INVENTION

This invention relates to an improved hinge-type table top chain in which a top plate, which is of light weight and defines a support surface for an article to be conveyed, is detachably mounted on a hinge-type base link.

BACKGROUND OF THE INVENTION

In a conventional chain arrangement for conveying articles, an elongated endless metal chain extends between horizontally spaced sprocket wheels, at least one of which is rotatably driven, and the top or upper reach of the chain defines a conveying surface for articles. The conventional metal chain is typically formed from metal links (FIGS. 1A and 1B) having integral top plates T on which articles are placed, which top plates terminate in hinge parts H for receiving therein pins P for hingedly connecting the top plates T together. This known link typically has a configuration which, when viewed from the end of the link, appears substantially as illustrated in FIG. 2A, in that the top plate T extends substantially tangentially between the hinge parts H defined on the opposite edges thereof, which hinge parts are formed as a curled or wound open portion substantially integral with and at the end of the top plate. However, during usage, it has been observed that the links undergo a change in configuration from that illustrated in FIG. 2A to that illustrated in FIG. 2B. This change in the link, as illustrated in FIG. 2B, is believed due to the severe tension imposed on the chain as a result of the load of the articles being conveyed thereon, and/or due to the fatiguing of the links. In this changed state illustrated by FIG. 2B, the upper conveying surface defined by the top plate T is hence deformed, and this results in substantial instability due to the inability of the articles positioned on the chain to make intimate supportive contact with the outer surface of the top plates. This can hence make conveying of the articles more difficult, and under some circumstances can be damaging to the articles.

The conventional chain illustrated by the link of FIG. 2A, particularly when deformed as illustrated by FIG. 2B, is also disadvantageous in that it is not possible to easily replace the deformed or worn top plate since it is integral with the link, and therefore the whole chain has to be replaced or disassembled to permit replacement of selected links. Further, since the whole chain is made up of metal links, the chain is heavy and thus a large driving force is required for the chain, and the metal chain also generates substantial noise which substantially undesirably affects the operating environment. Further, in those metal chains in which a floating preventive guide plate is required, the providing of such guide plate on the metal links is a troublesome manufacturing step inasmuch as such guide plates normally must be welded onto the lower surface of the top plate.

Accordingly, an object of the present invention is to overcome the above disadvantages by providing an improved hinge-type table top chain in which the articles can be conveyed in a stabilized manner without being damaged, the chain can be of light weight to minimize the required driving force, the generation of noises by the chain is substantially minimized, the top plate can be easily and individually removed from its respective chain link to permit replacement thereof without requiring disassembly of the chain, and the top plate can be easily and inexpensively molded from a plastics material and can have the guide plate integrally molded therewith if desired.

In the hinge-type table top chain arrangement of this invention, an endless base chain is formed from a plurality of hingedly connected metal link plates. A top plate is removably attached to the center portion of and effectively overlies each of the link plates, which top plate is preferably molded from a plastics material and defines an outer substantially planar surface for supportive engagement with articles to be conveyed. The top plates have end edges which, in the longitudinal direction of the chain, are disposed in close proximity to similar end edges as associated with top plates mounted on adjacent hingedly joined link plates.

Other objects and purposes of the invention will be apparent to persons familiar with chain arrangements of this general type upon reading the following specification and inspecting the accompanying drawings.

DETAILED DESCRIPTION

1. First Embodiment (FIGS. 3A through 3I)

Figure 1A:
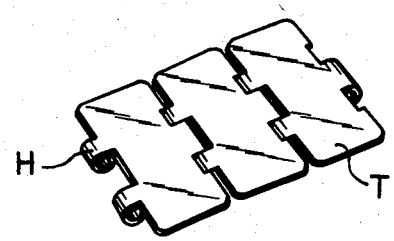
FIGS. 1A and 1B respectively illustrate the top and bottom sides of several hingedly connected metal links of a conventional table top chain conveyor FIG. 2A diagrammatically illustrates an end view of the conventional table top link of FIG. 1A.
Figure 1B:
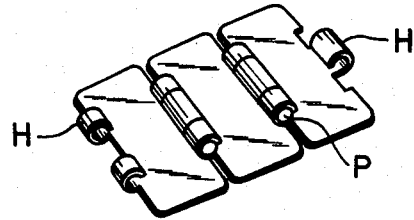
Figures 2A, 2B:
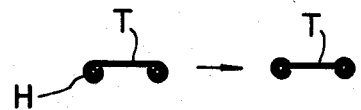
FIG. 2B is similar to FIG. 2A but illustrates the same link in a deformed condition.
Figure 3A:
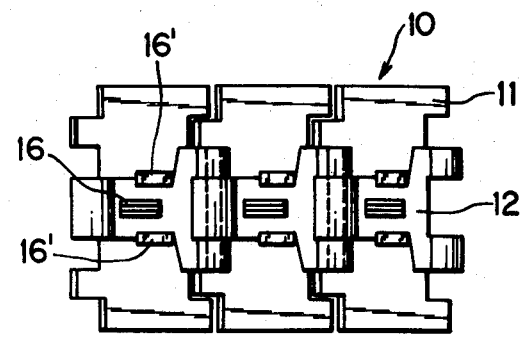
FIG. 3A is a bottom view of a first embodiment of a table top conveyor chain according to the present invention and illustrating several improved links hingedly connected together, which links employ a metal base plate having a removable top plate.
Figure 3B:
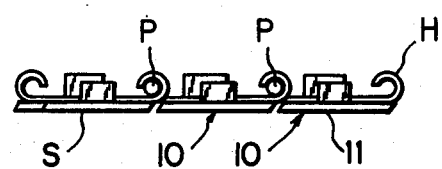
FIG. 3B is an end view of the structure shown in FIG. 3A.
Figure 3C:
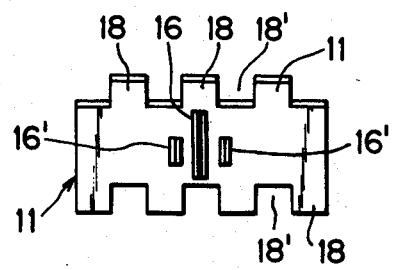
FIG. 3C is a bottom view of the removable top plate.
Figure 3D:
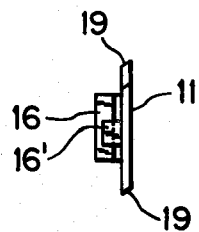
FIG. 3D is an end view thereof.
Figure 3E:
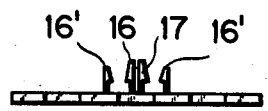
FIG. 3E is a side view thereof.
Figure 3F:
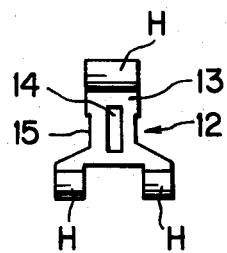
FIG. 3F is a bottom view of the link plate.
Figure 3G:
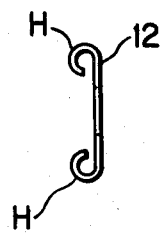
FIG. 3G is a side view thereof.
Figure 3I:
FIG. 3I is a view of the connecting hinge pin.
Figure 3H:
FIG. 3H is an end view thereof.
Figure 4A:
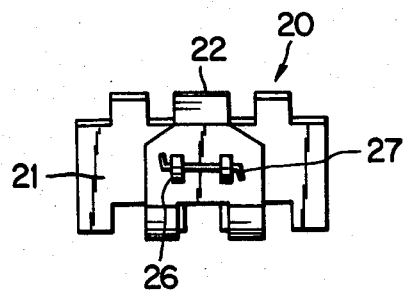
FIGS. 4A and 4B correspond to FIGS. 3A and 3B, respectively, but illustrate a second embodiment of the invention.
Figure 4B:
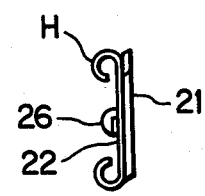
Figure 4D:
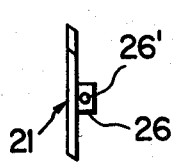
FIGS. 4C and 4D respectively illustrate the bottom and end views of the top plate associated with this second embodiment.
Figure 4C:
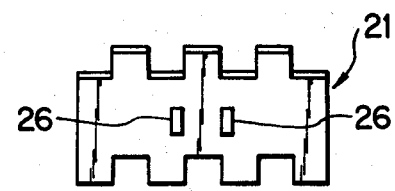
Figure 4E:
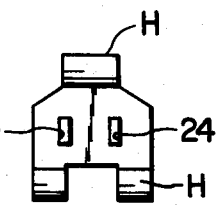
FIG. 4E is a bottom view of the link plate associated with this latter embodiment.
Figure 5A:
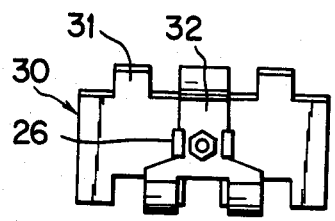
FIGS. 5A-5E, generally respectively correspond to FIGS. 4A-4E but illustrate a third embodiment of the invention.
Figure 5B:
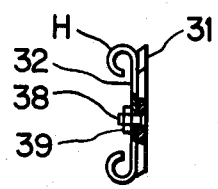
Figure 5C:
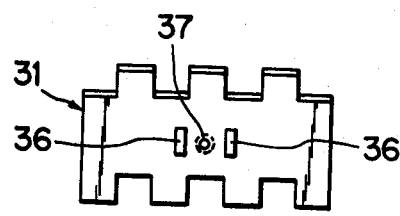
Figure 5E:
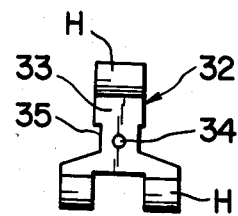
Figure 5D:
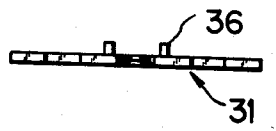
Figure 6A:
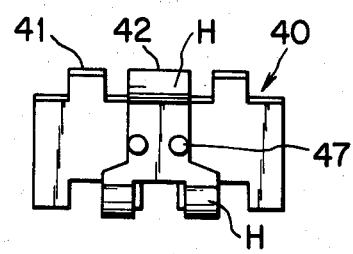
FIGS. 6A-6E substantially respectively correspond to FIGS. 4A-4E but illustrate a fourth embodiment of the invention.
Figure 6B:
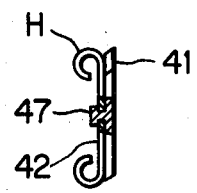
Figure 6C:
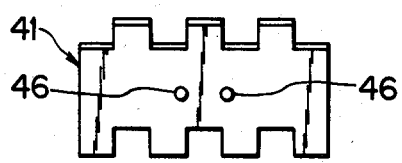
Figure 6E:
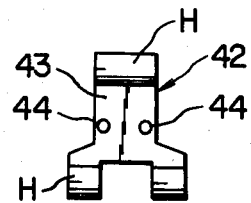
Figure 6D:
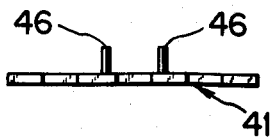

This embodiment relates to an endless link-type chain having a plurality of identical links 10 serially connected to form an endless loop. FIGS. 3A and 3B illustrate, for convenience only, only three links 10 which are serially and hingedly connected together.

Each link 10 includes a top plate 11 which is rigidly but detachably joined to a link plate 12.

The link plate 12 has a platelike central engaging portion 13 provided with an elongated slotlike opening or hole 14 extending perpendicularly therethrough. This central engaging portion 13 also has a pair of cut-out openings or recesses 15 formed on the opposite side edges thereof so as to be disposed on opposite sides of the opening 14.

The link plate 12 is, as is conventional, formed of metal, such as from flat metal plate, and the opposite ends thereof as they project outwardly from the central portion 13 are suitably wound into partial annular portions so as to form conventional knuckle-like hinge parts H. These hinge parts are wound such that the central portion 13 extends between the hinge parts in substantially tangential relationship thereto. The hinge parts H at opposite ends of the link are suitably staggered, such as by having one hinge part H at one end and a pair of spaced hinge parts H at the other end, to enable the hinge parts H of adjacent link plates 12 to be serially hingedly connected end-to-end by conventional hinge pins P. The hingedly connected link plates 12 hence define an endless base chain which thus provides support for the top plates 11 associated therewith.

The top plate 11 has a pair of leglike projections 16 which are fixed to and project substantially perpendicularly outwardly from the underside thereof. A further pair of similar leglike projections 16′ also project outwardly from the underside of the top plate, these latter projections 16′ being positioned on opposite sides of the projections 16. Each of the projections 16 and 16′ is preferably of a hooklike configuration provided with a wedgelike tang 17 adjacent the free end thereof, with the tangs on the pairs 16 and 16′ being sidewardly oriented in opposite directions.

The top plate 11 is of a one-piece construction and is formed, preferably by molding, of a synthetic resin (i.e., a plastics) material. The projections 16 and 16′, due to the manner in which they perpendicularly project from the underside of the top plate in a cantilevered fashion, possess at least limited resiliency so that these projections enable the top plate to create a snap-type locking engagement with the link plate 12. More particularly, to secure the top plate 11 and link plate 12 together, the top plate is moved downwardly relative to the link plate 12 so that the center projections 16 extend through the central opening 14, and simultaneously therewith the outer projections 16′ cooperate with the cut-out openings 15. The tangs 17 enable the projections 16 and 16′ to slightly resiliently deflect as the projections pass into and through the openings 14 and 15. After the projections move fully through the latter openings so that the top plate substantially rests on the central portion 13, then the resiliency of the projections 16 and 16′ enables them to snap into a position wherein the tangs 17, specifically the shoulders defined at the inner ends of the tangs, hence effectively lock into position underneath the central portion 13 of the link plate.

The two-piece construction of the link 10, as described above, enables the top plate 11 to be provided with a width which substantially exceeds the width of the link plate 12, and hence the top surface S of each top plate can thus be substantially enlarged to provide proper support for articles being conveyed.

In addition, the end edges of each top plate 11, that is, the edges in the longitudinal direction of the chain, are preferably provided with a substantially rectangular toothlike profile as defined by a plurality of substantially rectangular projections 18 which have similar rectangular recesses 18′ disposed therebetween. The toothlike profile on the opposite end edges is out of phase so that when the end edges of adjacent top plates 11 are disposed in series, the opposed end edges are positioned closely adjacent one another and the projections 18 on one top plate hence interfit with the recesses 18′ on the adjacent top plate. This prevents the creation of any substantial opening between the adjacent top plates, and hence effectively prevents the conveyed articles or objects from becoming trapped in or passing through such openings. Still further, the openings or clearances between the adjacent top plates is further minimized, and for this purpose the opposed end edges 19 of each top plate are preferably tapered (i.e., nonperpendicular to the top surface S) since this permits the opposed end edges of adjacent top plates to even more closely interfit and prevent creation of undesirable openings. Alternately, one edge could be of a circular concave curve and the opposite edge of a circular convex curve to permit a close fit therebetween. This edge arrangement is particularly significant when the chain, and the articles being conveyed thereon, is moving along a curve.

2. Second Embodiment (FIGS. 4A through 4E)

FIGS. 4A–4E illustrate another link 20 usable for defining an endless hingedly connected table top chain. This link 20 is formed by a top plate 21 which is rigidly but detachably connected to a link plate 22, which link plates 22 are hingedly connected in series by hinge pins which join the hinge parts H.

In this variation, the planar central engaging portion 23 of link plate 22 is provided with a pair of sidewardly spaced openings 24 extending therethrough. The top plate 21, on the underside thereof, is provided with a pair of sidewardly spaced projections 26, which projections snugly fit within and project through the openings 24. The projections 26 have aligned openings 26′ formed therethrough, such that after the top plate 21 has been seated on the link plate 22 so that the projections 26 extend through the openings 24, then a suitable locking pin 27 is inserted through the aligned openings 26′. The ends of pin 27 are suitably deformed to prevent it from being accidentally removed.

The structure of link 20, other than that described above, otherwise corresponds to the link 10.

3. Third Embodiment (FIGS. 5A through 5E)

The endless hingedly connected chain of this embodiment utilizes hingedly connected links 30, with each link 30 having a top plate 31 fixedly but removably attached to the underlying link plate 32. The link plate 32 has a central planar portion 33 provided with a central opening 34 extending therethrough, and the opposite side edges thereof are provided with cut-out openings or recesses 35. The top plate 31 has a similar opening 37 which is aligned with the opening 34. Opening 37 projects through the upper surface of the link plate and, at said upper surface, is provided with a tapered bore to accommodate the tapered head of a threaded fastener 38. Top plate 31 also has a pair of sidewardly spaced projections 36 which are fixed to and project downwardly from the underside thereof. These projections 36 engage within the cut-out recesses 35 to create a snapping-type engagement between the top plate 31 and the link plate 32. In addition, the threaded fastener or screw 38 extends through the aligned openings 34 and 37, the head of the fastener being substantially flush with the upper surface of the top plate, and a suitable nut 39 is threadedly engaged with the lower end of the fastener 38 to further rigidly secure the plates 31 and 32 together.

The structure of the link 30, other than those differences described above, otherwise corresponds to the aforedescribed link 10.

4. Fourth Embodiment (FIGS. 6A through 6E)

The hinge-type chain of this embodiment utilizes a plurality of serially connected links 40, each link 40 being of a two-piece construction employing a top plate 41 which is rigidly connected to a link plate 42, the latter having conventional hinge parts H so that adjacent link plates can be hingedly connected together by hinge pins in a conventional manner.

The link plate 42 has a central planar portion 43 provided with a pair of sidewardly spaced openings 44 extending therethrough. The top plate 41 has a pair of sidewardly spaced pinlike projections 46 projecting perpendicularly outwardly from the underside thereof. These projections 46 are inserted into and through the openings 44 to permit the top plate to bear against the link plate. Thereafter, the projecting ends of the projections 46 are caulked or flattened to define enlargements 47 which overlie the underside of the link plate 42 and hence fixedly secure the plates 41 and 42 together. In this embodiment, if replacement of the top plate 41 is desired, then the heads 47 can be sheared off, inasmuch as they are of plastic material, and a new top plate mounted on the respective link plate.

The other structure of the link 40, except for the differences described above, otherwise corresponds to the link 10 and hence is not described in detail.

5. Fifth Embodiment (FIGS. 7A through 7E)

This embodiment of chain utilizes a link 50 which is again of a two-piece construction formed by a top plate 51 and a link plate 52, the latter having conventional hinge parts H so that adjacent link plates can be hingedly connected by hinge pins in a conventional manner.

Figure 7A:
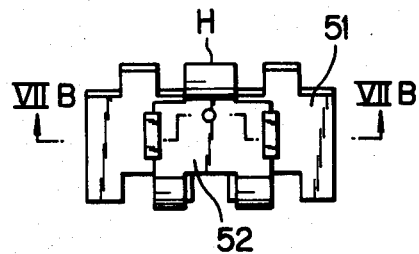
FIGS. 7A-7E substantially correspond to FIGS. 4A-4E but illustrate a fifth embodiment of the invention.
Figure 7B:
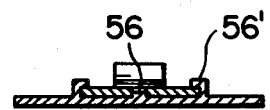
Figure 7C:
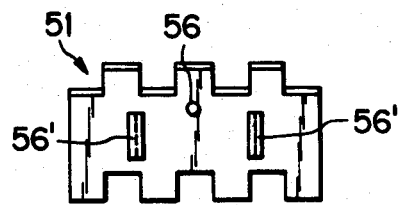
Figure 7E:
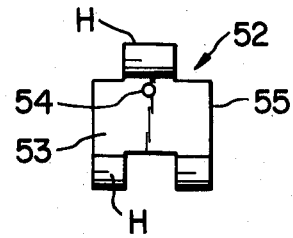
Figure 7D:
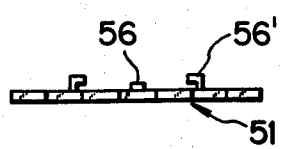
Figure 8A:
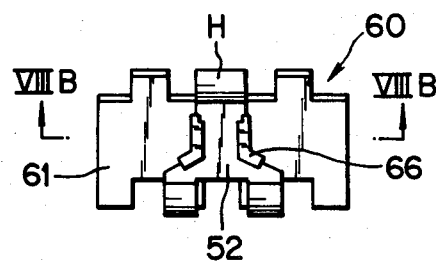
FIGS. 8A-8E substantially respectively correspond to FIGS. 4A-4E but illustrate a sixth embodiment of the invention.
Figure 8B:
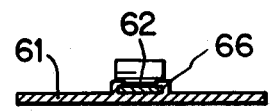
Figure 8C:
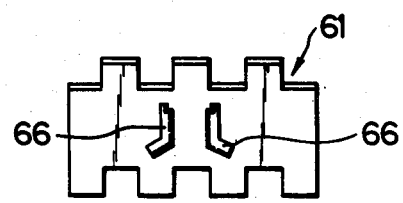
Figure 8E:
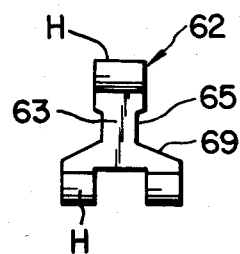
Figure 8D:
Figure 9A:
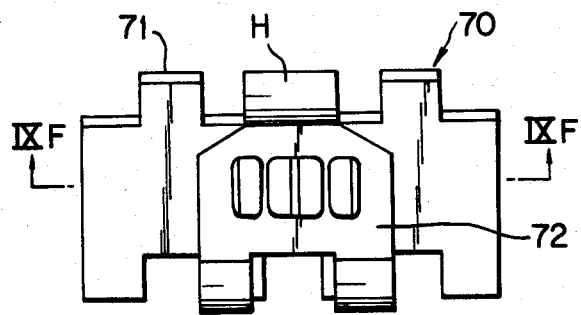
FIGS. 9A-9E substantially correspond to FIGS. 4A-4E and illustrate a seventh embodiment of the invention.
Figure 9B:
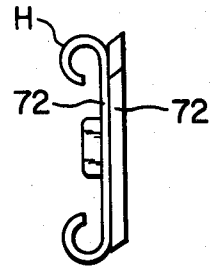
Figure 9C:
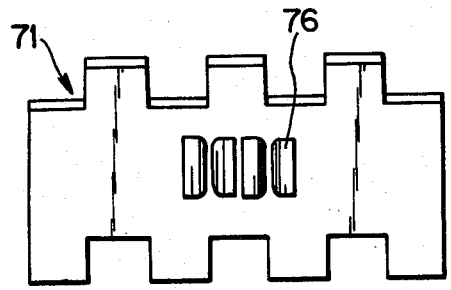
Figure 9E:
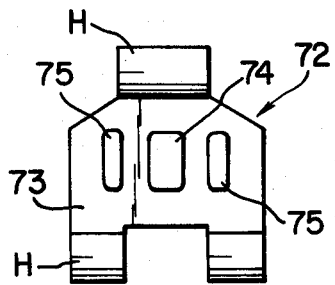
Figure 9D:
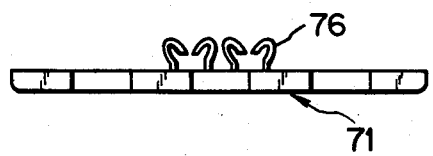
Figure 9F:
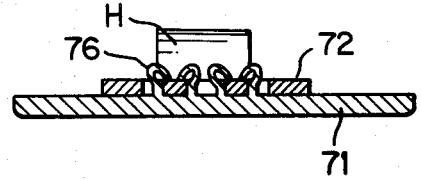
FIG. 9F is a fragmentary sectional view taken substantially along line IX—IX in FIG. 9A.

The link plate 52 has a central planar portion 53 provided with a single opening 54 extending therethrough, which opening in the illustrated embodiment is positioned more closely adjacent one edge of the link plate. The top plate 51, on the other hand, has a single pinlike projection 56 which projects downwardly from the underside thereof and is adapted to be accommodated in the opening 54. The top plate 51, however, also has a pair of sidewardly spaced leglike projections 56' projecting downwardly therefrom, which leglike projections 56' are substantially L-shaped and hence define a pair of opposed sidewardly opening grooves. These projections 56' are adapted to be positioned adjacent the opposite side edges 55 of the central plate portion 53 so that the edges 55 are accommodated within the grooves defined by the projections 56', as illustrated by FIG. 7B. In this embodiment, the projections 56' possess limited resiliency, and hence the two plates can be assembled by utilizing this resiliency, such as by first partially slidably inserting the edges 55 into the grooves defined by the projections 56', with the two plates effectively resiliently snapping together when the opening 54 and projection 56 are suitably aligned.

The remaining structure of the plates 51 and 52 corresponds to that of the link 10 described above.

6. Sixth Embodiment (FIGS. 8A through 8E)

A plurality of hingedly connected links 60 define the chain according to this embodiment. Each link 60 includes a top plate 61 removably but fixedly secured to a link plate 62, the latter again having hinge parts H joined together by suitable hinge pins. This link plate 62 does not have any central openings through the central planar part 63 thereof, although the opposite side edges of the central portion 63 are provided with cut-out openings or recesses 65 therealong. The central portion 63 is also provided with edges 69 which taper outwardly and rearwardly at the rearward ends of the recesses 65.

The top plate 61, on the other hand, has a pair of leglike projections 66 which are fixed to and project downwardly from the underside of the top plate in cantilevered relationship therewith. Each of these projections 66 is substantially L-shaped as it projects downwardly, whereby the projections 66 define a pair of opposed, sidewardly opening grooves which are sized so as to accommodate the thickness of the central platelike portion 63. These portions 66 are resiliently deflectable, and are adapted to engage within the recesses 65. The projections 66, when viewed from below, have a substantially L-shaped profile in that they have a lower leg portion which slopes outwardly and rearwardly in substantially the same relationship as the edge 69.

The plates 61 and 62 are engaged by relatively slidably inserting the link plate 62 into the top plate 61 so that the guide grooves defined by projections 66 snugly accommodate the edge 69 and the bottom edge of the recess 65. Further, since this recess 65 has a small shoulder formed at the forward end thereof, the projections 66 resiliently snap into the recesses 65 when properly aligned therewith, and hence provide a fixed securement between the plates 61 and 62.

7. Seventh Embodiment (FIGS. 9A through 9F)

The link 70 which defines the hinged chain of this embodiment is of a two-piece construction formed by a top plate 71 and a link plate 72, the latter having hinge parts H so that adjacent hinge plates can be hingedly connected in series.

The link plate 72 has a planar central engaging portion 73 provided with a central opening 74 extending therethrough. A further pair of openings 75 extend through the central portion 73 and are sidewardly spaced on opposite sides of the central opening 74.

The top plate 71 has plural pairs (two pairs in the disclosed embodiment) of resilient hooks 76 projecting outwardly from the underside thereof, which hooks have a configuration similar to a fish hook. These hooks are disposed in sidewardly adjacent pairs, and the two hooks of each pair face inwardly in opposed relationship toward one another.

To assemble the plates 71 and 72, the top plate 71 is relatively pressed downwardly toward the link plate 72 whereupon the hooks 76 bear against the edges of the openings 74 and 75, causing the hooks 76 to resiliently deflect so that they can pass through the openings 74 and 75. After passing through the openings, the hooks 76 resiliently snap back toward their original undeformed positions, whereupon the free ends of the hooks effectively engage the undersurface of the central platelike portion 73 adjacent the sides of the openings 74 and 75. The hooks 76 hence effect a rigid securement of the plates 71 and 72.

The remaining structure of link 70 substantially corresponds to that of link 10 described above.

8. Eighth Embodiment (FIGS. 10A through 10J)

The table top chain of this embodiment is formed from a plurality of hingedly connected links 80, each being of a two-piece construction formed by a top plate 81 which is fixedly but removably attached to a link plate 82, the latter having conventional hinge parts H for permitting adjacent links 80 to be hingedly connected by means of hinge pins P.

In the link 80, the link plate 82 has several sidewardly spaced openings 84 extending therethrough, and the top plate 81 has several (here, two pairs) of sidewardly spaced projections 86 extending downwardly from the underside thereof, which projections define resiliently deflectable cantilevered legs. These projections terminate in wedgelike locking tangs. These projections 86 are insertable through the openings 84, being cammed sidewardly due to the edge of the openings, whereupon the tangs on the projections resiliently snap into engagement with the underside of the central platelike portion 83 of the link plate 82 to fixedly lock the plates 81 and 82 together. This arrangement for connecting the plates 81 and 82 substantially corresponds to that of the first embodiment.

Figure 10A:
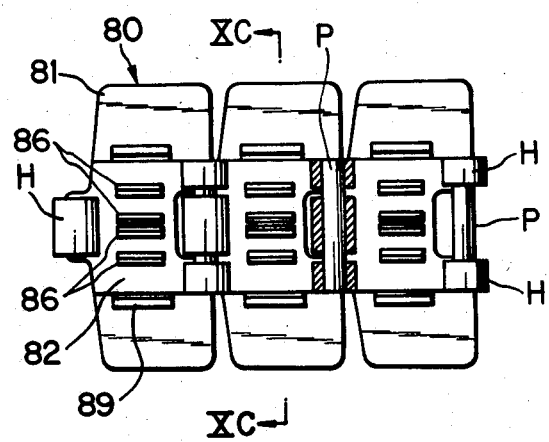
FIG. 10A illustrates the bottom side of a chain comprising an eighth embodiment of the invention, with FIG. 10B being an end view of FIG. 10A, and FIG. 10C being a sectional view taken along line XC—XC in FIG. 10A.
Figure 10C:
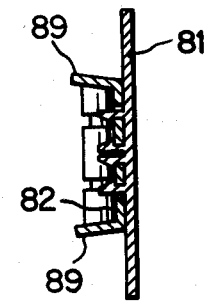
FIG. 10D is a bottom view of the top plate associated with this embodiment.
FIG. 10E is an end view thereof and FIG. 10F is a side view thereof.
FIG. 10G is a bottom view of the metal link plate associated with this embodiment.
FIG. 10H is an end view thereof.
FIG. 10I is an end view thereof.
FIG. 10J is a perspective view of the connecting hinge pin.
Figure 10B:
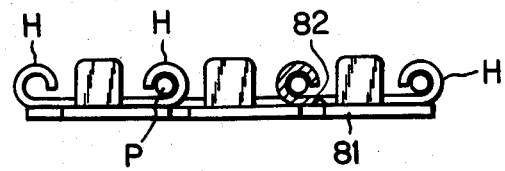
Figure 10D:
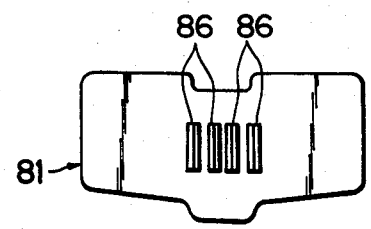
Figure 10F:
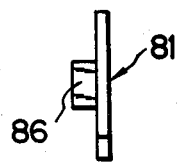
Figure 10E:
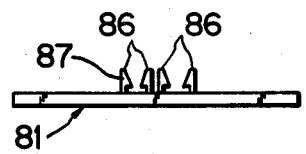
Figure 10G:
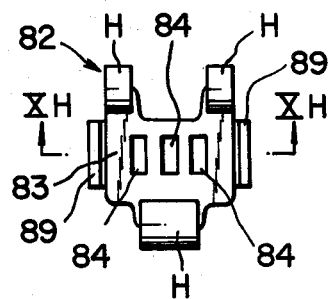
Figure 10I:
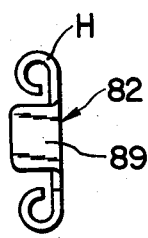
Figure 10J:
Figure 10H:
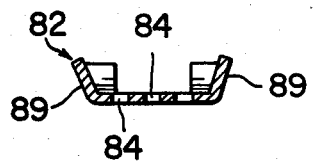

However, the link 80 is additionally provided with floating preventive guide plates 89 associated therewith. These guide plates 89 are, in this embodiment, integral with the link plate 82 and hence comprise metal plates 89 which are bent downwardly from opposite sides of the platelike central portion 83, whereby these guide plates 89 cause the central portion of the link plate to have a shallow channel-like shape as illustrated by FIG. 10H. These guide plates 89 project downwardly by a distance which slightly exceeds the downward projection of the hinge parts H so that the lower free edges of the guide plates will perform a guiding function and hence be engageable with a suitable guide rail and thus prevent the hinge parts from contacting this guide rail.

Other than the differences noted above, the link 80 otherwise corresponds to the link 10 as described above, although the top plate 81 is provided with a slightly modified toothlike profile along the end edges thereof.

9. Ninth Embodiment (FIGS. 11A through 11J)

This embodiment involves a chain formed from a plurality of serially connected links 90, which links 90 are, for the most part, substantially the same as the links 80 described above except for the structure of the floating preventive guide plates.

Figure 11A:
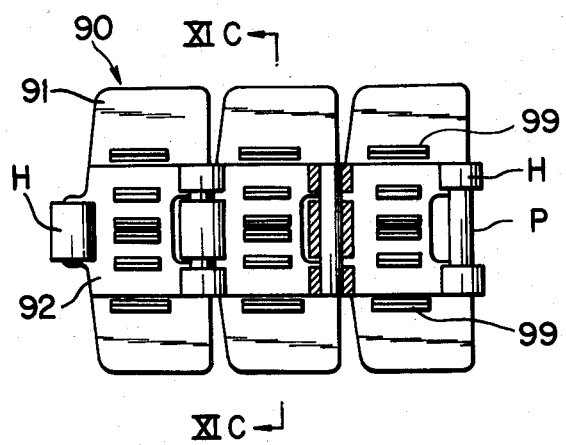
FIGS. 11A–11J illustrate a ninth embodiment, with the views thereof corresponding to FIGS. 10A–10J, respectively.
Figure 11C:
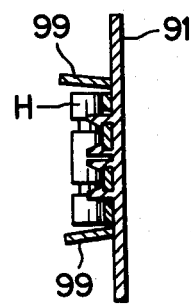
Figure 11B:
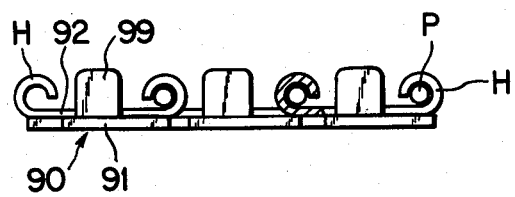
Figure 11D:
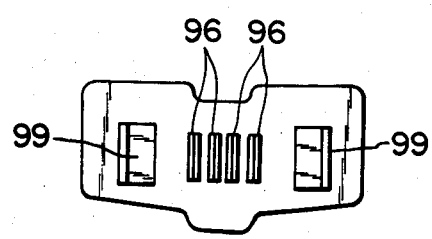
Figure 11F:
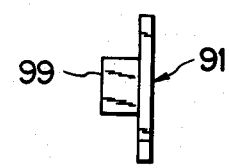
Figure 11E:
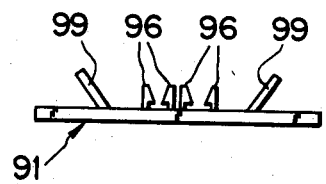
Figure 11G:
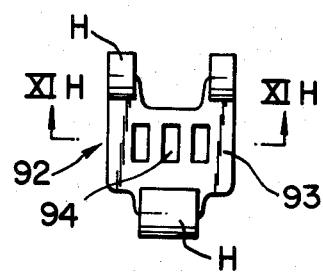
Figure 11I:
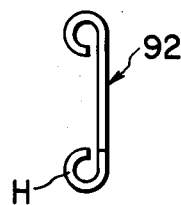
Figure 11J:
Figure 11H:

Each link 90 is of a two-piece construction formed by a top plate 91 and a link plate 92. As with the link 80, the top plate 91 has several resilient projections 96 which extend through openings 94 formed in the central portion 93 of the link plate to create a snap-type locking engagement therebetween. In this embodiment, however, the guide plates are not provided on the link plate 92, but rather are fixedly and integrally associated with the top plate 91. More specifically, the top plate 91 has a pair of guide plates 99 which are fixed to and project downwardly from the underside thereof. These guide plates 99 are disposed in sidewardly spaced relationship whereby the projections 96 are disposed therebetween. The guide plates 99 extend transversely from the underside of the top plate 91 and are integrally molded therewith. These plates 99 are spaced apart by a distance which slightly exceeds the width of the central plate portion 93 of the link plate so that the guide plates will effectively sidewardly straddle the link plate substantially as illustrated by FIG. 11C. Further, these plates 99 project downwardly by a distance such that the free ends of plates 99 are spaced downwardly a slightly greater distance than the hinge parts H so that the guide plates 99 are disposed so as to freely slidably engage a suitable stationary guide track or rail.

The link 90, other than the structure described above, otherwise substantially corresponds to the link 10.

In the numerous embodiments described hereinabove, the link plate (such as the link plate 12 of the first embodiment) is preferably formed of platelike metal, for example 18-8 stainless steel, 13 chrome stainless steel (hardened) or carbon steel, which materials are selected depending on the required strength of the chain so as to withstand the driving forces and the article loads imposed thereon.

The hinge-type table top chain of the present invention has the following advantages:

(a) Since the top plate is formed of synthetic resin, quiet operation can be expected due to the self-lubricatability inherent in synthetic resin. Even if articles fall onto the top plate, the damage is minimized. The chain is lightweight and, therefore, power expenses are low.

(b) Since a metal link plate is used for the base chain, the chain has a tensile strength sufficient to withstand heavy loads of articles. Construction of the chain is simple and, therefore, the chain can be easily separated merely by removing the connecting hinge pins.

(c) Since the projections are molded integral with the top plate as formed of synthetic resin, the engagement of the top plate with the link plate is simple and reliable.

(d) Since the top plate and the link plate are detachably mounted as individual members, the top plate can be separately and economically replaced.

(e) Even if the wound open hinge portions provided at the ends of the link plate are deformed due to severe chain tension resulting from the loads of articles to be conveyed, or the fatigue of the chain, no deformation occurs in the conveying surface of the top plate since the top plate is formed separately from the link plate, and therefore the articles can be conveyed in a stable manner.

(f) The floating preventive guide plates formed integral with the top plate or link plate are provided at end positions on both sides of the link plate in abutment with the top plate, whereby the guide plates can be easily formed without the separate provision of guide members. In view of the fact that, to reduce the sliding wear, sliding between the members of different materials is desirable, there is an advantage in that if the top plate is formed of synthetic resin, commercially available steel rails can be used as the guide rails for the top plate.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In a hinge-type table top chain having a plurality of substantially identical links hingedly interconnected in series to define an endless loop, the improvement wherein said link comprises:

a one-piece metal link plate formed from a platelike metal blank, said link plate having a central part and first and second hinge parts integral with said central part on opposite ends thereof for permitting adjacent link plates to be hingedly connected in series, said central part comprising a substantially planar platelike portion which extends substantially tangentially between said first and second hinge parts, each of said hinge parts being integrally joined to a said end of said central part and wound sidewardly relative thereto to form at least a partial annular portion which defines said hinge part, said planar platelike portion having opposite side edges defining said control part, said central part having first engaging means associated therewith, said first engaging means comprising a first central opening which extends transversely through said platelike portion and a pair of second openings which are positioned on opposite sides of said first opening and extend transversely through said platelike portion, said second openings comprising elongated slots which extend longitudinally along and open directly inwardly from a respective one of said side edges; and a one-piece top plate of a plastics material fixedly but removably attached to said link plate so as to overlie the latter and define an enlarged upper and substantially planar support surface which overlies and extends substantially parallel with said central part, said top plate having second engaging means integral therewith for engagement with said first engaging means for stationarily and fixedly connecting said top and link plates together;

said second engaging means including a first pair of hooklike legs which project transversely from the underside of said top plate and are resiliently deflectable for insertion through said first opening and for creating a snap-type engagement with the underside of said platelike portion, said second engaging means also including a second pair of hooklike legs which are disposed sidewardly on opposite sides of said first pair and which project transversely from the underside of said top plate so that each of said second hooklike legs projects through one of said second openings for creating a snap-type engagement with the underside of said platelike portion, the hooklike legs of each said pair being oppositely sidewardly directed.

* * * * *

UNITED STATES PATENT AND TRADEMARK OFFICE
CERTIFICATE OF CORRECTION

PATENT NO. : 4 611 710

DATED : September 16, 1986

INVENTOR(S) : Takashi MITSUFUJI

It is certified that error appears in the above-identified patent and that said Letters Patent is hereby corrected as shown below:

Column 9, line 24; change "control" to ---central---.

Signed and Sealed this

Tenth Day of March, 1987

Attest:

DONALD J. QUIGG

*Attesting Officer*       *Commissioner of Patents and Trademarks*